(12) United States Patent
Kim et al.

(10) Patent No.: US 7,977,883 B2
(45) Date of Patent: Jul. 12, 2011

(54) PLASMA DISPLAY PANEL COMPRISING MAGNESIUM OXIDE PROTECTIVE LAYER

(75) Inventors: Jae-Hyuk Kim, Suwon-si (KR);
Sung-Hwan Moon, Suwon-si (KR);
Dong-Hyun Kang, Suwon-si (KR);
Yury Matulevich, Suwon-si (KR);
Hee-Young Chu, Suwon-si (KR);
Mi-Hyun Lee, Suwon-si (KR);
Chang-Hyuk Kim, Suwon-si (KR);
Jong-Seo Choi, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 271 days.

(21) Appl. No.: 12/408,600

(22) Filed: Mar. 20, 2009

(65) Prior Publication Data

US 2010/0060139 A1 Mar. 11, 2010

Related U.S. Application Data

(60) Provisional application No. 61/094,748, filed on Sep. 5, 2008.

(51) Int. Cl.
*H01J 17/49* (2006.01)
(52) U.S. Cl. ........................................ 313/587; 313/582
(58) Field of Classification Search ........... 313/582–587
See application file for complete search history.

(56) References Cited

U.S. PATENT DOCUMENTS

| 4,721,610 | A | 1/1988 | Yoshida et al. |
| 7,795,811 | B2 * | 9/2010 | Maeshima et al. ............ 313/587 |
| 2008/0309238 | A1 | 12/2008 | Choi et al. |

FOREIGN PATENT DOCUMENTS

| EP | 1 600 921 A2 | 11/2005 |
| EP | 1 833 070 A2 | 9/2007 |
| EP | 1 883 092 A2 | 1/2008 |
| EP | 2 031 629 A1 | 3/2009 |

OTHER PUBLICATIONS

Chhor, K., et al.: Syntheses of submicron magnesium oxide powders, Material Science Communication, 1995 Materials Chemistry and Physics, May 25, 1994: pp. 63-68, vol. 40. Elsevier Science S.A., Villetaneuse, France.
European Search Report: EP 09 16 9475. May 20, 2010, Munich.

* cited by examiner

*Primary Examiner* — Anne M Hines
(74) *Attorney, Agent, or Firm* — Knobbe Martens Olson & Bear LLP

(57) ABSTRACT

Disclosed is a material for forming a protective layer, a protective layer employing the material and a PDP with the protective layer. Unlike conventional protective layers which employ MgO created in conditions of pressurized artificial gas, the instant protective layer uses MgO created by heating Mg and allowing it to oxidize naturally in air. The result is MgO with fewer defects that is more effective as a protective layer in many uses, such as in a PDP. The instant MgO also shows many specific spectral characteristics and contains impurities in amounts of less than about 2 ppm each. Also disclosed is a PDP which takes advantage of the advantages of the inventive protective layer.

11 Claims, 8 Drawing Sheets

PLASMA DISPLAY PANEL COMPRISING MAGNESIUM OXIDE PROTECTIVE LAYER

CROSS-REFERENCE TO RELATED PATENT APPLICATIONS

This application claims the benefit of U.S. Provisional Patent Application No. 61/094,748, filed on Sep. 5, 2008, in the USPTO, the disclosure of which is incorporated herein in its entirety by reference.

BACKGROUND

Description of the Related Art

A conventional protective layer of a PDP comprises double layers that are formed of coating a magnesium oxide powder on a magnesium oxide thin film, wherein the magnesium oxide powder is prepared by vapor deposition. In detail, the magnesium oxide powder for forming the conventional protective layer is prepared by heating magnesium in a chamber and injecting and oxidizing an atmospheric gas, such as oxygen ($O_2$), hydrogen ($H_2$), or argon, into the chamber. The magnesium oxide powder prepared as described above has many defects and relatively many impurities.

The present embodiments overcome the problems in the related art and provide additional advantages as well.

SUMMARY

Some embodiments relate to a MgO powder prepared by the method comprising:
heating Mg in air to a temperature sufficient to generate Mg vapor;
allowing the Mg to react with the air and become naturally oxidized to yield the MgO powder,
wherein the magnesium oxide powder has a first cathode-luminescence spectrum emission peak at a wavelength from about 300 nm to about 370 nm, and a second emission peak at a wavelength from about 600 to about 640 nm,
and wherein the intensity ratio of the first emission peak to the second emission peak is from about 1:0.4 to about 1:0.6.

In some embodiments, the MgO comprises less than 2 ppm of each of nickel (Ni), iron (Fe), barium (B), silicon (Si), manganese (Mn), chrome (Cr), calcium (Ca), copper (Cu), zirconium (Zr), aluminum (Al), and sodium (Na).

Some embodiments further comprise a third emission peak at a wavelength from about 700 nm to about 800 nm, wherein the intensity ratio of the first emission peak to the third emission peak is from about 1:0.25 to about 1:0.45.

Some embodiments relate to a protective layer comprising:
an MgO having a first cathode-luminescence spectrum emission peak at a wavelength from about 300 nm to about 370 nm, and a second emission peak at a wavelength from about 600 to about 640 nm,
and wherein the intensity ratio of the first emission peak to the second emission peak is from about 1:0.4 to about 1:0.6.

In some embodiments, the MgO comprises less than 2 ppm of each of nickel (Ni), iron (Fe), barium (B), silicon (Si), manganese (Mn), chrome (Cr), calcium (Ca), copper (Cu), zirconium (Zr), aluminum (Al), and sodium (Na).

Some embodiments further comprise wherein the magnesium oxide powder has a third emission peak at a wavelength from about 700 nm to about 800 nm and wherein the intensity ratio of the first emission peak to the third emission peak is from about 1:0.25 to about 1:0.45.

Some embodiments relate to a plasma display panel comprising:
a front panel through which light is emitted to the outside of the PDP,
a rear panel on which phosphors are disposed,
a plurality of transparent electrodes disposed on a front glass substrate,
bus electrodes disposed on the transparent electrodes in parallel to the transparent electrodes,
a front dielectric layer configured to cover the transparent electrodes and bus electrodes,
a protective layer configured to cover the front dielectric layer, and
a discharge gas,
wherein the protective layer comprises MgO having a first cathode-luminescence spectrum emission peak at a wavelength from about 300 nm to about 370 nm, and a second emission peak at a wavelength from about 600 to about 640 nm,
and wherein the intensity ratio of the first emission peak to the second emission peak is from about 1:0.4 to about 1:0.6.

In some embodiments, the protective layer include a first protective portion and a second protective portion,
wherein the first protective portion comprises polycrystalline magnesium oxide,
wherein the second protective portion comprises the MgO.

In some embodiments, the second protective portion is irregularly formed on the first protective portion.

In some embodiments, the second protective portion has a maximum intensity from about 0.5 to about 10 times that of the first protective portion.

In some embodiments, the first protective portion comprises polycrystalline magnesium oxide having a cathode-luminescence spectrum emission peak at a wavelength from about 380 nm to about 400 nm.

In some embodiments, the MgO comprises less than 2 ppm of each of nickel (Ni), iron (Fe), barium (B), silicon (Si), manganese (Mn), chrome (Cr), calcium (Ca), copper (Cu), zirconium (Zr), aluminum (Al), and sodium (Na).

Some embodiments further comprise wherein the magnesium oxide powder has a third emission peak at a wavelength from about 700 nm to about 800 nm wherein the intensity ratio of the first emission peak to the third emission peak is from about 1:0.25 to about 1:0.45.

In some embodiments, the second protective portion covers substantially the entire top surface of the first protective portion.

In some embodiments, the second protective portion is formed by one selected from the group consisting of patterning and inject printing.

In some embodiments, the discharge gas comprises Xe.

In some embodiments, the discharge gas comprises about 10% Xe.

BRIEF DESCRIPTION OF THE DRAWINGS

The above and other features and advantages of the present embodiments will become more apparent by describing in detail exemplary embodiments thereof with reference to the attached drawings in which.

DETAILED DESCRIPTION

Figure 1:
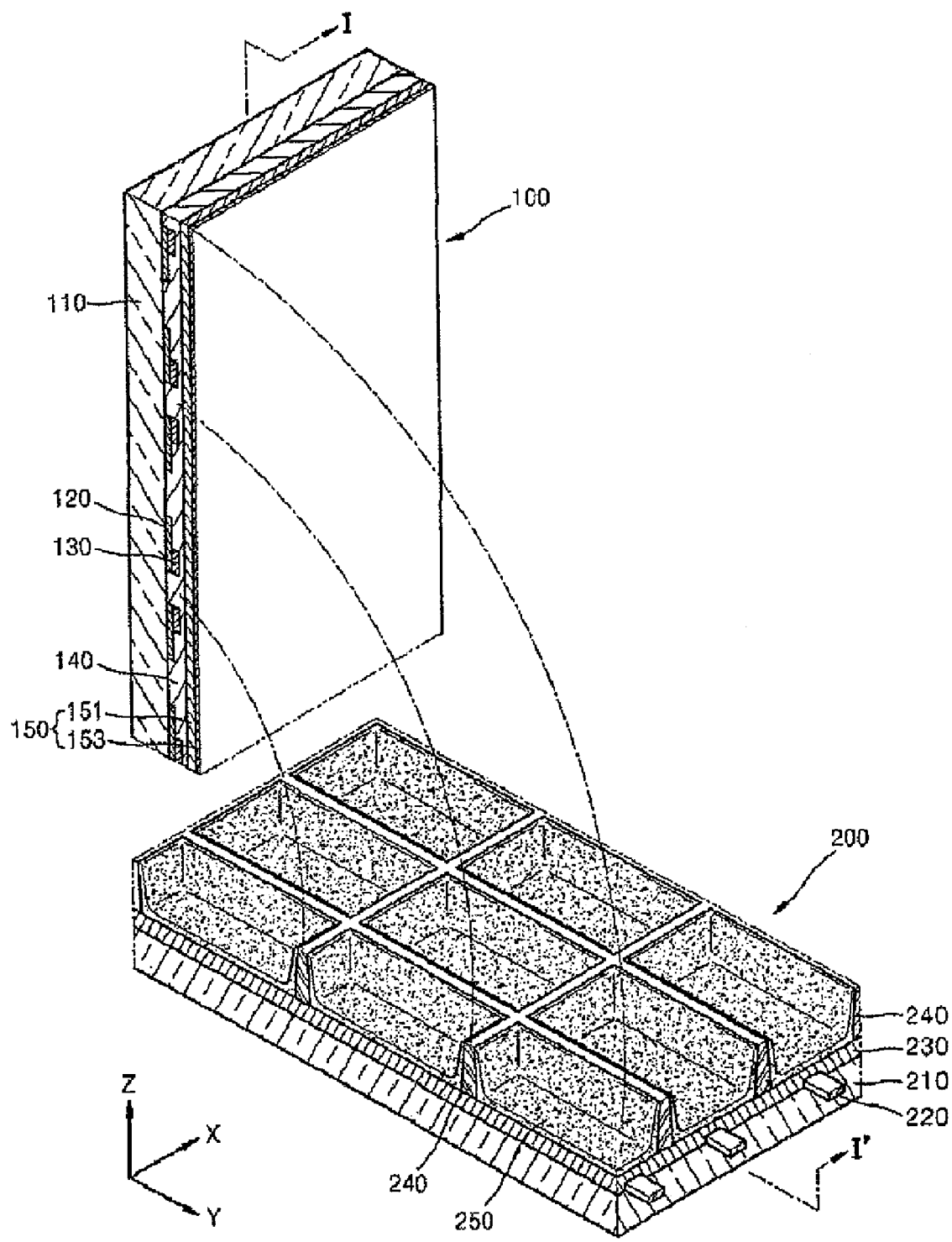
FIG. 1 is an exploded perspective view of a plasma display panel (PDP) according to an embodiment.

The present embodiments will now be described more fully with reference to the accompanying drawings, in which exemplary embodiments are shown.

The present embodiments provide a material for forming a protective layer of a PDP which has few defects and few impurities. The present embodiments also provide a method of preparing the material, and a PDP including a protective layer formed of the material.

According to an embodiment, there is provided a material for forming a protective layer of a PDP, the material comprising a magnesium oxide powder, wherein, when a cathode luminescence spectrum is measured, the magnesium oxide powder has a first emission peak in a wavelength range of from about 300 to about 370 nm, and a second emission peak in a wavelength range of from about 600 to about 640 nm. An intensity ratio of the first emission peak to the second emission peak may be from about 1:0.40 to about 1:0.60.

Also, the magnesium oxide powder can further comprise a third emission peak in a wavelength range of from about 700 to about 800 nm. An intensity ratio of the first emission peak to the third emission peak may be from about 1:0.25 to about 1:0.45.

The magnesium oxide may be formed by natural oxidation through which magnesium is heated without artificial gas injection.

According to another embodiment, there is provided a PDP comprising a protective layer formed of the material. The protective layer may be formed by dispersing the magnesium oxide powder in a solvent to prepare a solution and coating the solution by spin coating, spraying, or printing. Accordingly, the cathode luminescence characteristics of the material are transferred to the protective layer. When a cathode-luminescence spectrum is measured, the protective layer has a first emission peak in a wavelength range of from about 300 to about 370 nm, and a second emission peak in a wavelength range of from about 600 to about 640 nm. An intensity ratio of the first emission peak to the second emission peak may be from about 1:0.40 to about 1:0.60.

Also, the protective layer can further comprise a third emission peak in a wavelength range of from about 700 to about 800 nm. An intensity ratio of the first emission peak to the third emission peak may be from about 1:0.25 to about 1:0.45.

A material for forming a protective layer and a method of preparing the material according to the present embodiments will now be explained.

Magnesium (Mg) in the form of granules or chips is heated in the air to generate vapor. The magnesium may be heated by a heating method, such as torch heating, resistance heating, or high frequency induction heating, in the air or in a gas atmosphere containing air and inert gas. When the vapor reacts with the air and is naturally oxidized, a magnesium oxide is produced. When the magnesium is heated to a temperature over a predetermined level, the magnesium ignites to generate vapor. The generated vapor reacts with the air to prepare a magnesium oxide powder that is thermodynamically stable.

When a cathode-luminescence spectrum is measured, the magnesium oxide powder has a first emission peak in a wavelength range of from about 300 to about 370 nm, and a second emission peak in a wavelength range of from about 600 to about 640 nm. An intensity ratio of the first emission peak to the second emission peak of the magnesium oxide powder may be from about 1:0.40 to about 1:0.60. Also, the magnesium oxide powder further comprises a third emission peak in a wavelength range of from about 700 to about 800 nm. An intensity ratio of the first emission peak to the third emission peak of the magnesium oxide powder may be from about 1:0.25 to about 1:0.45.

Also, the magnesium oxide powder has a maximum intensity from about 0.5 to about 10 times higher than that of a conventional magnesium oxide thin film having an emission peak in a wavelength range of 380 to 400 nm. Since the conventional magnesium oxide thin film has the emission peak in the wavelength range of 380 to 400 nm, the conventional magnesium oxide thin film has defects called F+ centers in which a single electron is trapped by an oxygen vacancy. Accordingly, the conventional magnesium oxide thin film has the F+ centers, and the maximum intensity of the emission peak of the oxide magnesium powder according to the present embodiments is from about 0.5 to about 10 times higher than that of the conventional magnesium oxide thin film. The maximum intensity of the emission peak of the magnesium oxide powder according to the present embodiments in the wavelength range of from about 300 to about 370 nm is from 0.5 to about 10 times higher than the maximum intensity of the emission peak of the conventional magnesium oxide thin film in the wavelength range of 380 to 400 nm. Since the emission peak having a maximum intensity of the magnesium oxide powder according to the present embodiments is not in the wavelength range of 380 to 400 nm, the magnesium oxide powder does not have the defects. Here, the magnesium oxide thin film is a polycrystalline magnesium oxide thin film prepared by a deposition method, such as electron beam (e-beam) deposition or ion-plating, using a single-crystalline magnesium oxide pellet or a polycrystalline magnesium oxide sintered body as a source. However, the magnesium oxide powder according to the present embodiments does not have the defects called F+ centers since the emission peak of the magnesium oxide powder is not in the wavelength range of 380 to 400 nm. The maximum intensity of the emission peak of the magnesium oxide powder according to the present embodiments is about 1/1000 as high as that of a magnesium oxide powder that is oxidized by artificially injecting a gas. Since the magnesium oxide powder according to the present embodiments is naturally oxidized, the magnesium oxide powder has little external restriction and is thermodynamically stable, thereby resulting in relatively few defects.

In addition, since a melting point and a boiling point of magnesium at an atmospheric pressure are respectively as low as about 922 K and about 1364 K, respectively when the magnesium oxide powder according to the present embodiments is prepared, most of other metals that are considered as impurities do not generate vapor, thereby making it possible to produce a high purity magnesium oxide. The high purity magnesium oxide powder may contain at least one impurity of nickel (Ni), iron (Fe), barium (B), silicon (Si), manganese (Mn), chrome (Cr), calcium (Ca), copper (Cu), zirconium (Zr), aluminum (Al), and sodium (Na) in an amount less than about 2 ppm by weight based on the total weight of the magnesium oxide powder.

A PDP including a protective layer formed of the material will now be explained with reference to FIGS. 1 and 2.

Figure 2:
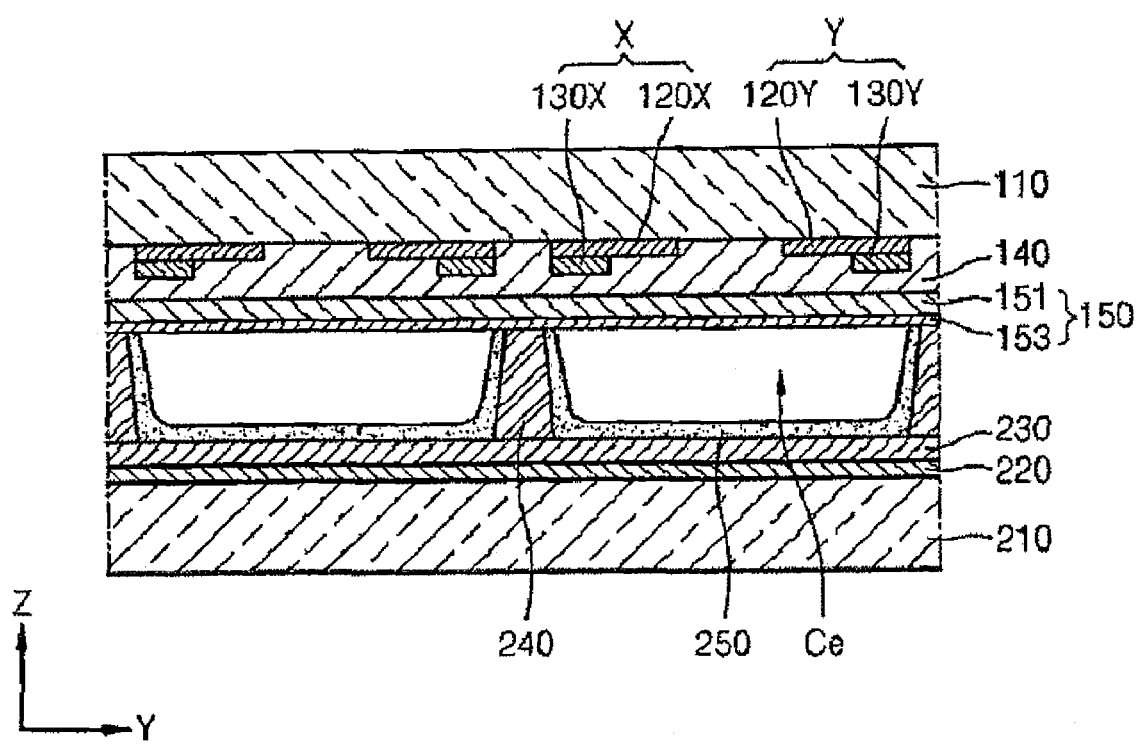
FIG. 2 is a cross-sectional view taken along line I-I' of the PDP of FIG. 1.

Referring to FIGS. 1 and 2, the PDP includes a front panel 100 through which light is emitted to the outside of the PDP, and a rear panel 200 on which phosphors are disposed to emit light.

Regarding the front panel 100, a plurality of transparent electrodes 120 are disposed on a front glass substrate 110 to extend in an X direction, and bus electrodes 130 are disposed on the transparent electrodes 10 in parallel to the transparent electrodes 120. A front dielectric layer 140 and a protective layer 150 are sequentially stacked on the front glass substrate 110 to cover the transparent electrodes 120 and the bus electrodes 130. The front dielectric layer 140 may protect the transparent electrodes 120 and the bus electrodes 130 from direct collisions with charged particles participating in a discharge. The front dielectric layer 140 may be protected by the protective layer 150.

The protective layer 150 may include a first protective layer 151 and a second protective layer 153. The first protective layer 151 is a polycrystalline magnesium oxide thin film prepared by e-beam deposition or ion-plating using a magnesium oxide sintered body as a source. The magnesium oxide sintered body is formed by sintering a magnesium oxide powder that may be prepared by precipitation, general vapor deposition, or specific vapor deposition according to the present embodiments.

The second protective layer 153 is formed by dispersing the magnesium oxide powder prepared as described above in a solvent to prepare a solution and coating the solution by spin coating, spraying, or printing on the first protective layer 151. The solution may include various additives such as a disperser, a surfactant, or an anti-oxidant as well as the solvent.

Since the second protective layer 153 is formed by coating the magnesium oxide powder on the first protective layer 151, the characteristics of the magnesium oxide powder are transferred to the second protective layer 153. That is, when a cathode luminescence spectrum is measured, the second protective layer 153 may have a first emission peak in a wavelength range of from about 300 to about 370 nm, and a second emission peak in a wavelength range of from about 600 to about 640 nm. Also, the second protective layer 153 further comprises a third emission peak in a wavelength of from about 700 to about 800 nm. An intensity ratio of the first emission peak to the second emission peak of the second protective layer 153 may be from about 1:0.40 to about 1:0.60. Also, an intensity ratio of the first emission peak to the third emission peak of the second protective layer 153 may be from about 1:0.25 to about 1:0.45. By contrast, the first protective layer 151 has an emission peak in a wavelength range of from about 380 to about 400 nm, and has F+ centers. Even though the second protective layer 153 has F+ centers, the F+ centers of the second protective layer 153 are less than the F+ centers of the first protective layer 151. Also, the second protective layer 153 has a maximum intensity 0.5 to 10 times higher than that of the first protective layer 151. The first protective layer 151 corresponds to the magnesium oxide thin film. Since the magnesium oxide thin film is transferred to the first protective layer 151, the cathode luminescence spectrum and defect characteristics of the first protective layer 151 corresponds to those of the magnesium oxide thin film.

Although the second protective layer 153 may cover 100% of a top surface of the first protective layer 151, the present embodiments are not limited thereto and the second protective layer 153 may cover only 1% or more of the top surface of the first protective layer 151 for the purpose of transmittance improvement. Also, although the second protective layer 153 may be irregularly formed on the first protective layer 151, the present embodiments are not limited thereto and the second protective layer 153 may be formed by patterning or inkjet printing to have a predetermined pattern. The second protective layer 153 may be formed on the first protective layer 151 to correspond to barrier ribs 240 and the bus electrodes 130 that are covered during a discharge so as not to emit light to the outside of the PDP.

Although the protective layer 150 has a double-layer structure including the first protective layer 151 and the second protective layer 153 in FIGS. 1 and 2, the present embodiments are not limited thereto and the protective layer 150 may include only the second protective layer 153. In order to improve productivity, the first protective layer 151, which can easily cover the front dielectric layer 140, may be first formed and then the second protective layer 153 may be formed on the first protective layer 151 to form the protective layer 150.

Regarding the rear panel 200, a plurality of address electrodes 220 are disposed on a rear glass substrate 210 to extend in a Y direction. A rear dielectric layer 230 is disposed to cover the address electrodes 220, and the barrier ribs 240 are formed to divide a discharge space into a plurality of discharge cells Ce. Phosphor layers 250 are disposed in the discharge cells Ce. The phosphor layers 250 are disposed on sidewalls of the barrier ribs 240 and on the rear dielectric layer 230. In detail, the phosphor layers 250 may be respectively disposed in the plurality of discharge cells Ce. In more detail, red phosphor layers, green phosphor layers, and blue phosphor layers may be respectively disposed in the discharge cells Ce. A discharge gas is injected as an ultraviolet ray source into the discharge cells Ce. The discharge gas may be a multi-component gas including xenon (Xe), krypton (Kr), helium (He), and neon (Ne) at a predetermined volume ratio such that ultraviolet rays are radiated to excite the phosphor layers 250. In particular, the second protective layer 153 can significantly reduce a firing voltage and a sustain voltage even under a discharge gas atmosphere containing 50% by volume of xenon (Xe). Accordingly, a discharge gas containing a large amount of xenon (Xe), for example, 10% or more by volume based on the total volume of the discharge gas, may be used. The discharge gas containing the large amount of xenon (Xe) has high luminous efficiency, but there is a limitation in practically using the discharge gas containing the large amount of xenon (Xe) because a high firing voltage is required, a driving voltage and power consumption are increased, and a circuit for increasing rated power needs to be redesigned. However, since the protective layer according to the present embodiments can reduce a firing voltage and a sustain voltage, the drawback of the discharge gas containing the large amount of xenon (Xe) can be overcome.

Referring to FIG. 2, each of the discharge cells Ce forms an independent area from an adjacent discharge cell due to the barrier ribs 240. In detail, the discharge cells Ce include sustain electrode pairs X and Y and address electrodes 220 extending in a direction perpendicular to the sustain electrode pairs X and Y. Each of the sustain electrode pairs X and Y includes an X electrode X and a Y electrode Y. The X electrode X includes an X transparent electrode 120X and an X bus electrode 130X, and the Y electrode Y includes a Y transparent electrode 120Y and a Y bus electrode 130Y. A voltage is alternately applied to the sustain electrode pairs X and Y to generate a display discharge. Prior to the display discharge, an address discharge is generated between the Y electrode Y and the address electrodes 220. The address discharge enables priming particles to be accumulated in a discharge cell Ce to be displayed to generate a display discharge and emit light to the outside of the PDP.

An embodiment, comparative examples, and a contrastive example for the material for forming the protective layer, and evaluations of the embodiment, the comparative examples, and the contrast example will now be explained in detail.

Embodiment For Material For Protective Layer—Magnesium Oxide Powder A 1 g of magnesium in the form of a pellet was burnt for 15 seconds in a propane-oxygen flame. The propane-oxygen flame was ignited at a temperature of 700 to 900° C. and the magnesium was heated to a temperature of 2300 to 3300° C. to generate vapor. The vapor was collected to produce a magnesium oxide powder A. Here, the magnesium was heated in an atmospheric environment containing no inert gas and no artificial gas.

COMPARATIVE EXAMPLE 1 FOR MATERIAL FOR PROTECTIVE LAYER

Magnesium Oxide Powder B

A magnesium oxide powder B was prepared by precipitation. Magnesium ions dissolved in seawater was precipitated as a magnesium hydroxide by using caustic soda, calcium hydroxide, and calcined dolomite. That is, the magnesium hydroxide was obtained by a reaction represented by Chemical Formula 1, and was thermally treated at a temperature of 500° C. or more to obtain the magnesium oxide powder B by a reaction represented by Chemical Formula 2.

$$MgCl_2 + 2NaOH = Mg(OH)_2 + 2NaCl \quad (1)$$

$$Mg(OH)_2 \rightarrow MgO + H_2O \quad (2)$$

COMPARATIVE EXAMPLE 2 FOR MATERIAL FOR PROTECTIVE LAYER

Magnesium Oxide Powder C 1 g of magnesium was subjected to resistance heating in a chamber to generate magnesium vapor. Oxygen ($O_2$) and argon (Ar) were added to the magnesium vapor at flow rates of 2 liters/min and 5 liters/min, respectively, to prepare a magnesium oxide powder C.

COMPARATIVE EXAMPLE 3 FOR MATERIAL FOR PROTECTIVE LAYER

Magnesium Oxide Powder D

A magnesium oxide powder D was prepared in the same way as for Comparative Example 2 for the material for forming the protective layer except that oxygen ($O_2$) and argon (Ar) were added to a magnesium vapor at flow rates of 10 liters/min and 1 liter/min, respectively.

CONTRASTIVE EXAMPLE

Polycrystalline Magnesium Oxide Thin Film D

A polycrystalline magnesium oxide thin film E was prepared to a thickness of 7000 Å on a dielectric layer by e-beam deposition using 100 g of polycrystalline magnesium oxide pellet as a source. The polycrystalline magnesium oxide pellet was prepared by sintering the magnesium oxide powder B of the Comparative Example 1.

Evaluation 1: Cathode Luminescence Spectrum

The cathode luminescence characteristics of the magnesium oxide powders A, B, C, and D of Embodiment and Comparative Examples and the polycrystalline magnesium oxide thin film E of Contrastive Example were evaluated.

Each of the magnesium oxide powders A, B, C, and D was pressed to prepare a pellet. The pellet was prepared to have a surface-to-volume ratio of 90 to 95%. The cathode luminescence characteristics of the pellets of the magnesium oxide powders A, B, C, and D were measured by accelerating and focusing electron beams of 5 keV. The cathode luminescence characteristics of the polycrystalline magnesium oxide thin film E of Contrastive Example were also measured by accelerating and focusing electron beams of 5 keV. A used electron beam source was a Ta disc, EGPS-3101C, made by Kimball Physics, and a spot size during collisions between the electron beams and the pellets was approximately 1 mm. Also, a used spectrometer was SpectraPro 2500i made by Action, and intensity was to calculate a sum of intensities measured in 300, 500, and 750 gratings/mm.

Figure 3A:
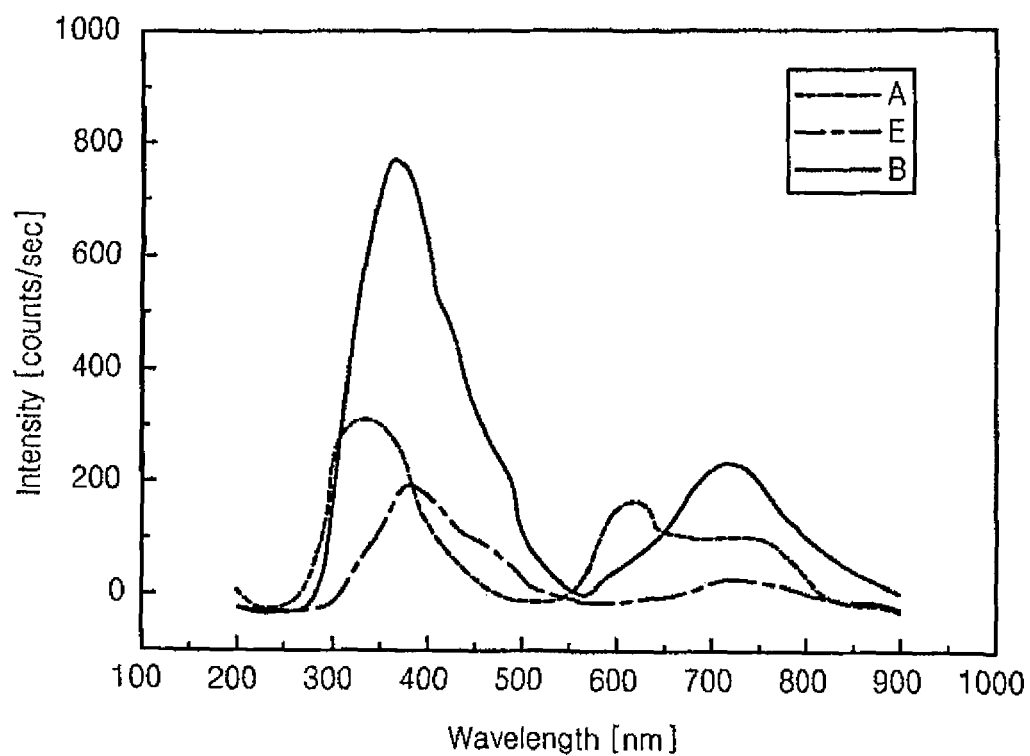
FIGS. 3A and 3B are graphs illustrating a cathode luminescence spectrum of a material for forming each of protective layers.

Referring to FIG. 3A, the magnesium oxide powder A of Embodiment had an emission peak in a wavelength range of 300 to 500 nm. In detail, the magnesium oxide powder A had an emission peak in a wavelength range of 300 to 370 nm, a second emission peak in a wavelength range of 600 to 640 nm, and a third emission peak in a wavelength range of 700 to 800 nm. An intensity ratio of the emission peak to the second emission peak to the third emission peak was approximately 1:0.52:0.37. The intensity of the emission peak was 300 counts/sec.

The magnesium oxide powder B prepared by precipitation had an emission peak having an maximum intensity in a wavelength range of 300 to 450 nm and an emission peak having a second highest intensity in a wavelength range of 650 to 750 nm. The maximum intensity of the emission peak was approximately 800 counts/sec.

The polycrystalline magnesium oxide thin film E of Contrastive Example had an emission peak having an maximum intensity in a wavelength range of 350 to 450 nm and an emission peak having a second highest intensity in a wavelength range of 650 to 750 nm.

Figure 3B:
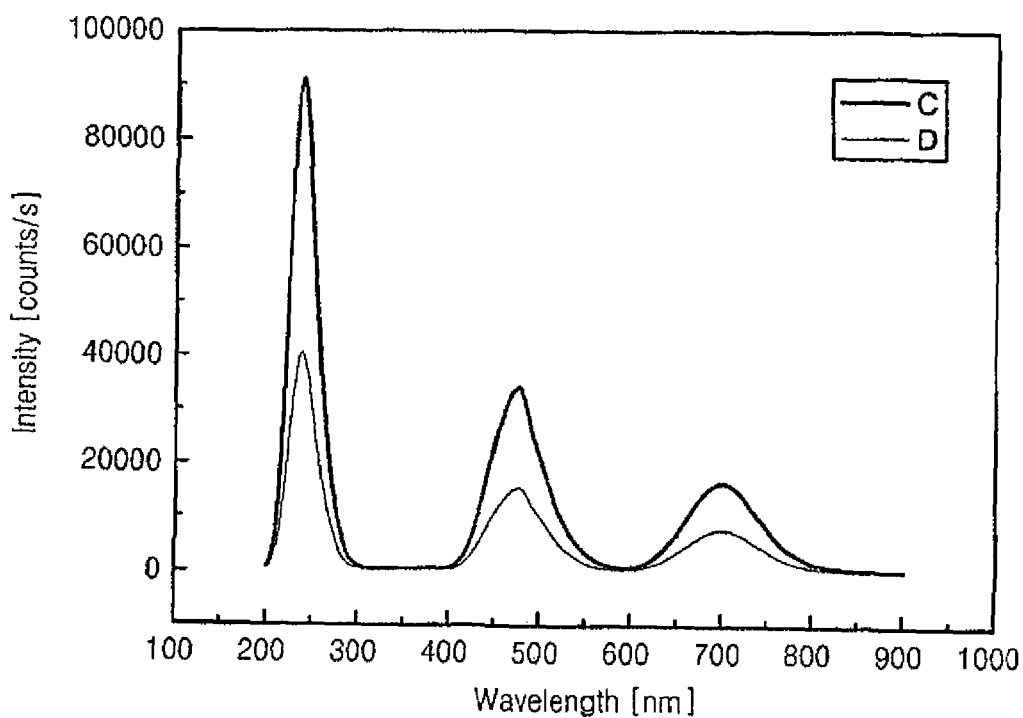

Referring to FIG. 3B, the magnesium oxide powders C and D prepared by other vapor depositions had emission peaks in wavelengths of approximately 200 nm to approximately 250 nm, approximately 450 nm to approximately 500 nm, and approximately 650 nm to approximately 750 nm. The maximum intensities of the emission peaks of the magnesium oxide powders C and D were 90000 and 40000 counts/sec, respectively.

Accordingly, since the magnesium oxide powder A of Embodiment according to the present embodiments had a spectrum different from those of the magnesium oxide powders B, C, and D and the polycrystalline magnesium oxide thin film E, the magnesium oxide powder A of Embodiment had defects different from the those of the magnesium oxide powders B, C, and D and the polycrystalline magnesium oxide thin film E. Also, since the maximum intensity of the emission peak of the magnesium oxide powder A of Embodiment was much lower than those of the magnesium oxide powders B, C, and D, the magnesium oxide powder A of Embodiment had fewer defects than those of the magnesium oxide powders B, C, and D. That is, the magnesium oxide powder A of Embodiment had superior crystalline characteristics.

Evaluation 2

An inductive coupled plasma (ICP) analysis was performed on 5 g of each of the magnesium oxide powders A, B, C, and D and results of the ICP analysis are shown in Table 1. In Table 1, ND denotes non-detected.

TABLE 1

| | (ppm) | | | | | | | | | | |
|---|---|---|---|---|---|---|---|---|---|---|---|
| | Ni | Fe | B | Si | Mn | Cr | Ca | Cu | Zr | Al | Na |
| A | ND | ND | ND | ND | ND | <1.0 | ND | ND | ND | ND | ND |
| B | ND | 1.5 | ND | <1.0 | <1.0 | <1.0 | 9.1 | <1.0 | ND | ND | 155 |
| C | ND | ND | ND | ND | 2.4 | <1.0 | ND | ND | ND | ND | 4.1 |
| D | ND | ND | ND | ND | 11 | <1.0 | 6.8 | ND | ND | ND | ND |

Referring to Table 1, the magnesium oxide powder A of Embodiment had fewer impurities than the magnesium oxide powders B, C, and D of Comparative Examples. In detail, 5 g of the magnesium oxide powder A of Embodiment contained 1.0 ppm impurities, and 5 g of the magnesium oxide powders B, C, and D of Comparative Examples had approximately 168.6, 7.5, and 18.8 ppm impurities, respectively.

An embodiment, comparative examples, and evaluations for the protective layer of the PDP formed by using the aforementioned material will now be explained in detail.

Embodiment For Protective Layer Of
Pdp—Protective Layer A

After a disk type silver (Ag) electrode that generates an opposed discharge and has a diameter of 8 mm was formed on a substrate that was PD200 made by Asahi, a lead oxide (PbO)-based dielectric layer was formed to a thickness of approximately 35 µm on the electrode. A first protective layer was formed on the dielectric layer to a thickness of 700 nm by e-beam deposition using a polycrystalline magnesium oxide source.

300 mg of the magnesium oxide powder A of Embodiment was mixed with 5 ml of absolute alcohol to prepare a solution, and the solution was coated by spin coating on the first protective layer to a thickness of 1 µm to form a second protective layer.

COMPARATIVE EXAMPLE 1 FOR PROTECTIVE
LAYER OF PDP

Protective Layer B

A protective layer was prepared in the same way as for the protective layer of Embodiment except that the magnesium oxide powder B of Comparative Example 1 instead of the magnesium oxide powder A of Embodiment and spin coating were used.

COMPARATIVE EXAMPLE 2 FOR PROTECTIVE
LAYER OF PDP

Protective Layer C

A protective layer was prepared in the same way as for the protective layer of Embodiment except that the magnesium oxide powder C of Comparative Example 2 instead of the magnesium oxide powder A of Embodiment and spin coating were used.

COMPARATIVE EXAMPLE 3 OF PROTECTIVE
LAYER OF PDP

Protective Layer D

A protective layer was prepared in the same way as for the protective layer of Embodiment except that the magnesium oxide powder D of Comparative Example 3 instead of the magnesium oxide powder A of Embodiment and spin coating were used.

Evaluation 3

Figure 4A:
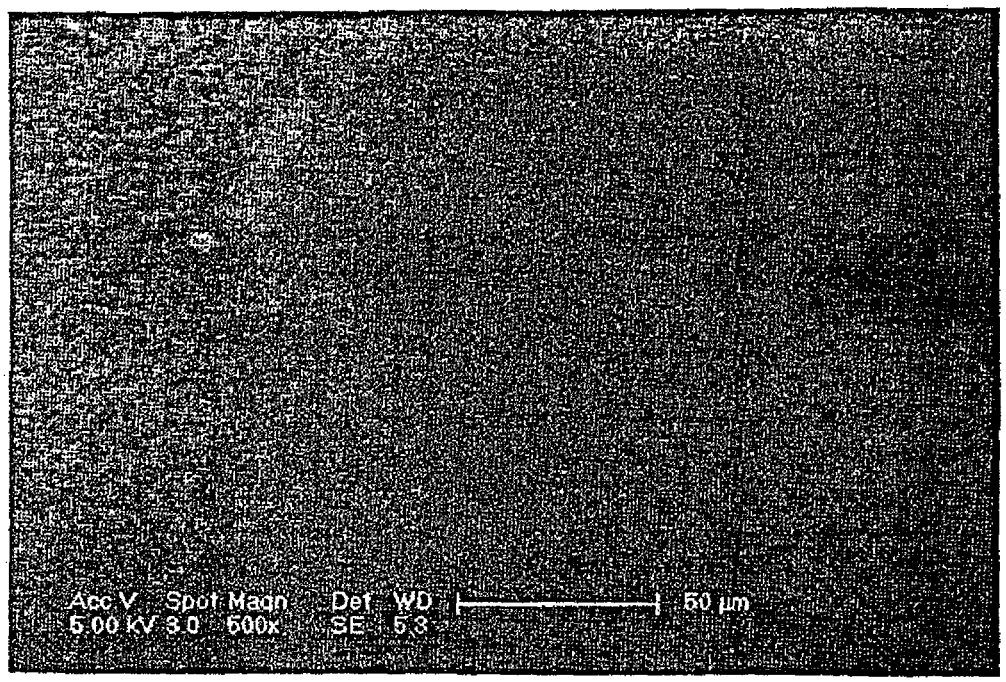
FIGS. 4A and 4B are SEM images of the protective layer according to an embodiment.
Figure 4B:
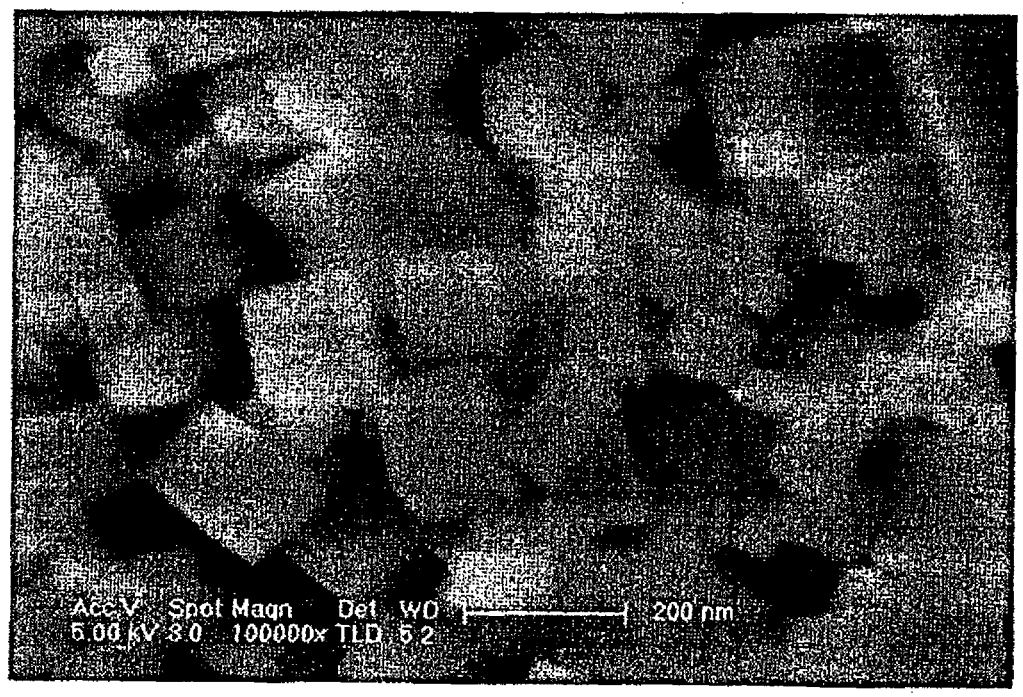

FIGS. 4A and 4B are scanning electron microscopic (SEM) images of a surface of the protective layer of Embodiment. FIG. 4A is an SEM image taken at 500-times magnification and FIG. 4B is an SEM image taken at 100,000-times magnification.

Referring to FIG. 4B, a plurality of single crystalline magnesium oxide particles aggregate. The single crystalline magnesium oxide particles have sizes of 100 to 500 nm which are substantially uniform.

Evaluation 4

A firing voltage and a sustain voltage of each of the protective layers A to D of Embodiment and Comparative Examples were measured using a singe wave of 2 kHz under a discharge gas atmosphere containing 15% by volume of xenon (Xe) and 85% by volume of neon (Ne). A firing voltage and a sustain voltage of the polycrystalline magnesium oxide thin film E of Contrastive Example were also measured using a singe wave of 2 kHz under a discharge gas atmosphere containing 15% by volume of xenon (Xe) and 85% by volume of neon (Ne).

Figure 5A:
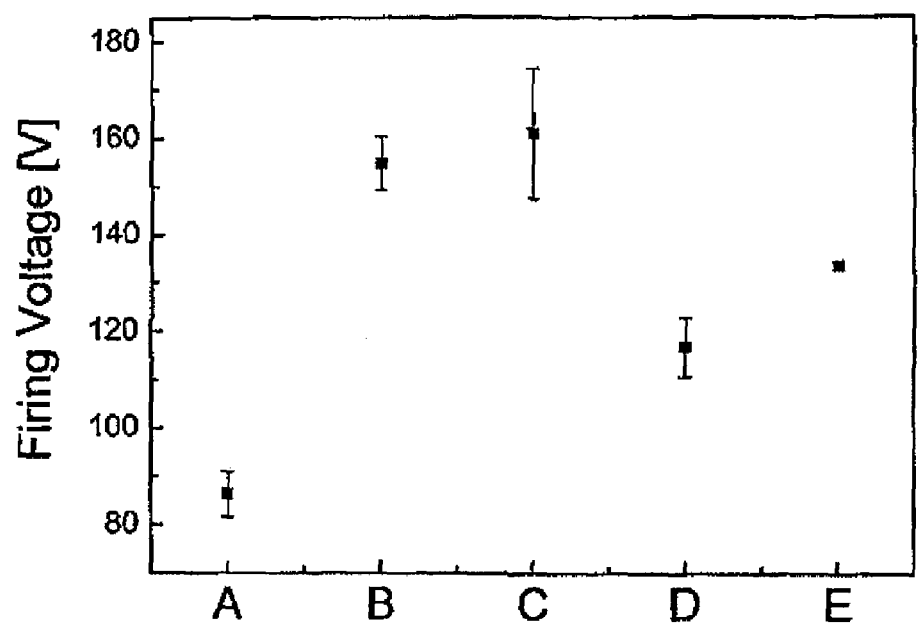
FIGS. 5A and 5B are graphs illustrating a firing voltage and a sustain voltage of each of the protective layers under a discharge gas atmosphere containing 15% by volume of Xenon (Xe)
Figure 5B:
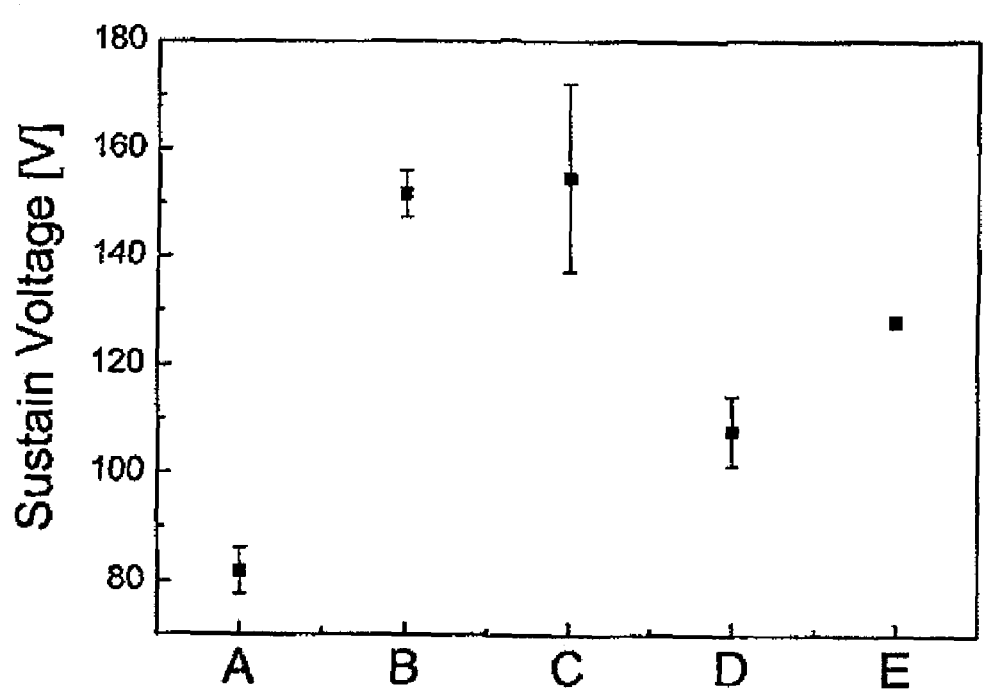

Referring to FIG. 5A illustrating a firing voltage and FIG. 5B illustrating a sustain voltage, a firing voltage and a sustain voltage of the protective layer A were much lower than those of the protective layer B and the protective layers C and D. In detail, the firing voltage and the sustain voltage of the protective layer A were approximately 35% lower than those of the polycrystalline magnesium oxide thin film E of Contrastive Example.

Evaluation 5

A firing voltage and a sustain voltage were measured after the content of xenon was increased. A firing voltage and a sustain voltage were measured, in the same way as for Evaluation 4, under a discharge gas atmosphere containing 50% by volume of xenon (Xe) and 50% by volume of neon (Ne).

Figure 6A:
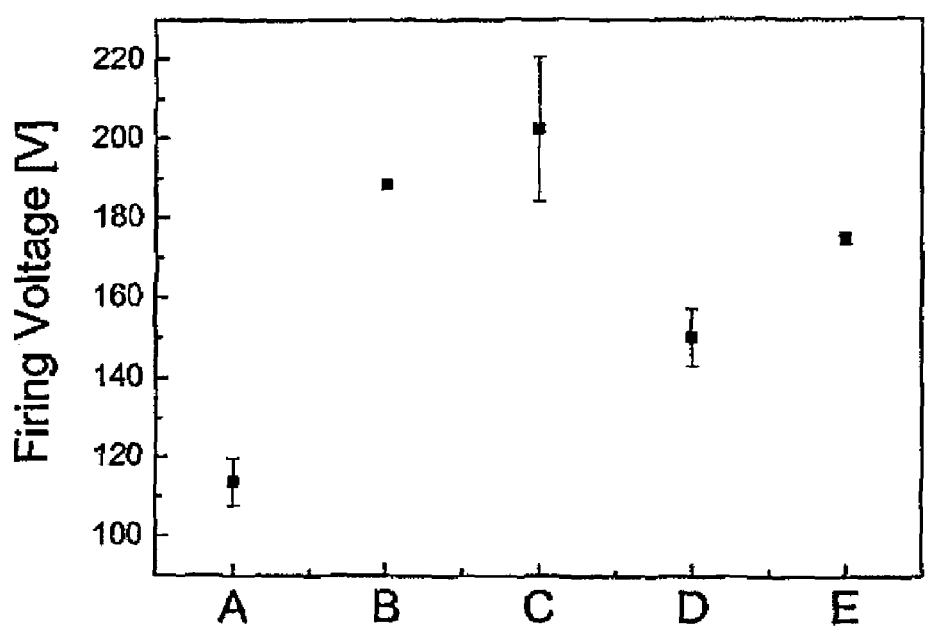
FIGS. 6A and 6B are graphs illustrating a firing voltage and a sustain voltage of each of the protective layers under a discharge gas containing 50% by volume of Xenon (Xe)
Figure 6B:
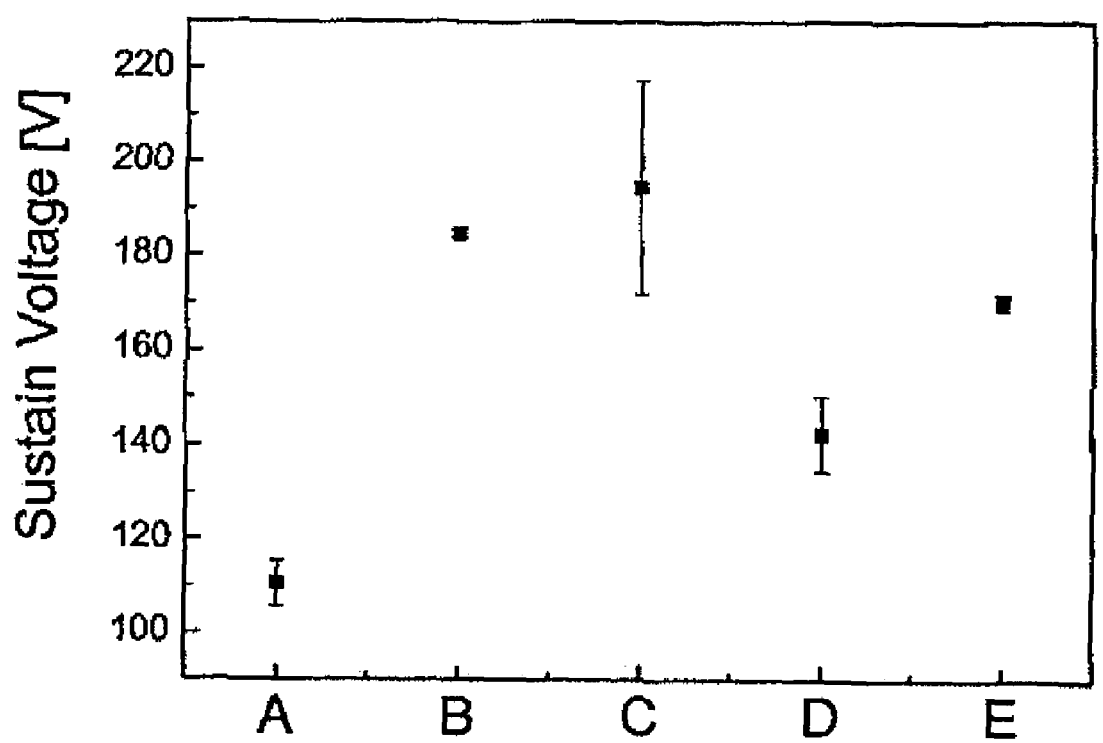

Referring to FIGS. 6A and 6B, the firing voltage and the sustain voltage of the protective layer A were much lower than those of the protective layers B, C, and D, and were approximately 35% lower than those of the polycrystalline magnesium oxide thin film E of Contrastive Example.

Furthermore, even after the content of xenon (Xe) was increased up to 50% by volume, the firing voltage and the sustain voltage of the protective layer A were much lower than those of the polycrystalline magnesium oxide thin film E of Contrastive Example which contains 15% by volume of xenon (Xe), thereby improving discharge efficiency and ensuring stable operation.

Evaluation 6

The light emission characteristics of the protective layers A to D of Embodiment, Comparative Examples, and Contrastive Example were evaluated.

In detail, a sample of each protective layer which has a size of 2×2.5 cm was prepared, a surface of the sample was scanned at a temperature 300° C. for 240 minutes at 1 keV by using Ar+ ions in order to activate and clean the surface of the sample and was excited by a 254 nm ultraviolet (UV) source, and the quantity of electrons emitted from the sample was measured by using an electron detector at a height of about 1 to 2 cm over the sample.

Figure 7:
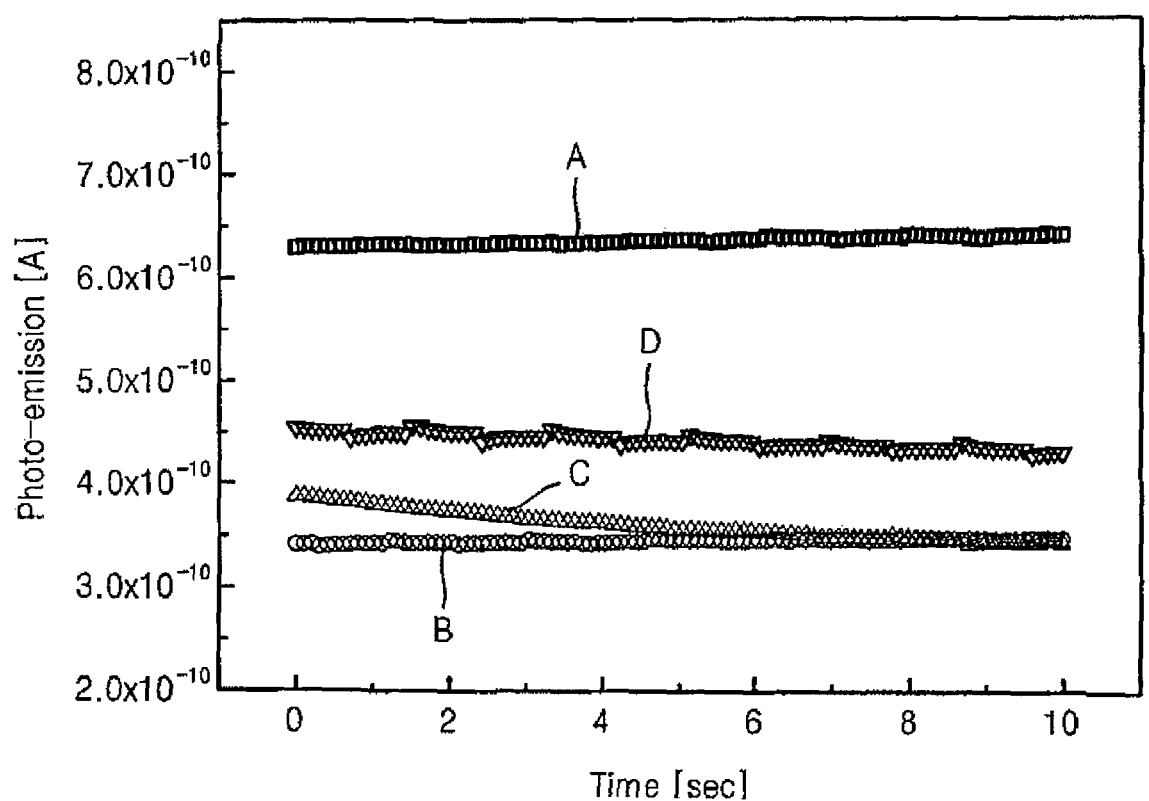
FIGS. 7 and 8 are graphs illustrating photoelectron emission characteristics.

Referring to FIG. 7, the protective layer A had much higher light emission characteristics than the protective layers B, C, and D of Comparative Examples.

Accordingly, during a real discharge, a discharge voltage can be reduced by increasing a value $\gamma_{effective}$. The value $\gamma_{effective}$ may be defined by $$\gamma_{effective} = \gamma_{ion} + \gamma_{metastable} + \gamma_{photon} + \gamma_{exo} + \cdots \quad (1).$$

As shown in Mathematical Formula 1, effective secondary electron emission in a discharge space may be determined not only by potential emission due to ions but also by secondary electron emission due to excited spices, photons, and exo-emission,

Evaluation 7

The quantity of secondary electrons emitted for approximately 300 seconds after the supply of a discharge voltage was cut off was measured.

A sample of each protective layer which has a size of 2×2.5 cm was prepared and was excited for 5 minutes by using a 160 nm vacuum ultraviolet (VUV) source, and the quantity of electrons emitted from the sample was measured by using the electron detector at a height of about 1 to 2 cm over the sample in 5 seconds after the VUV source was removed.

Figure 8:
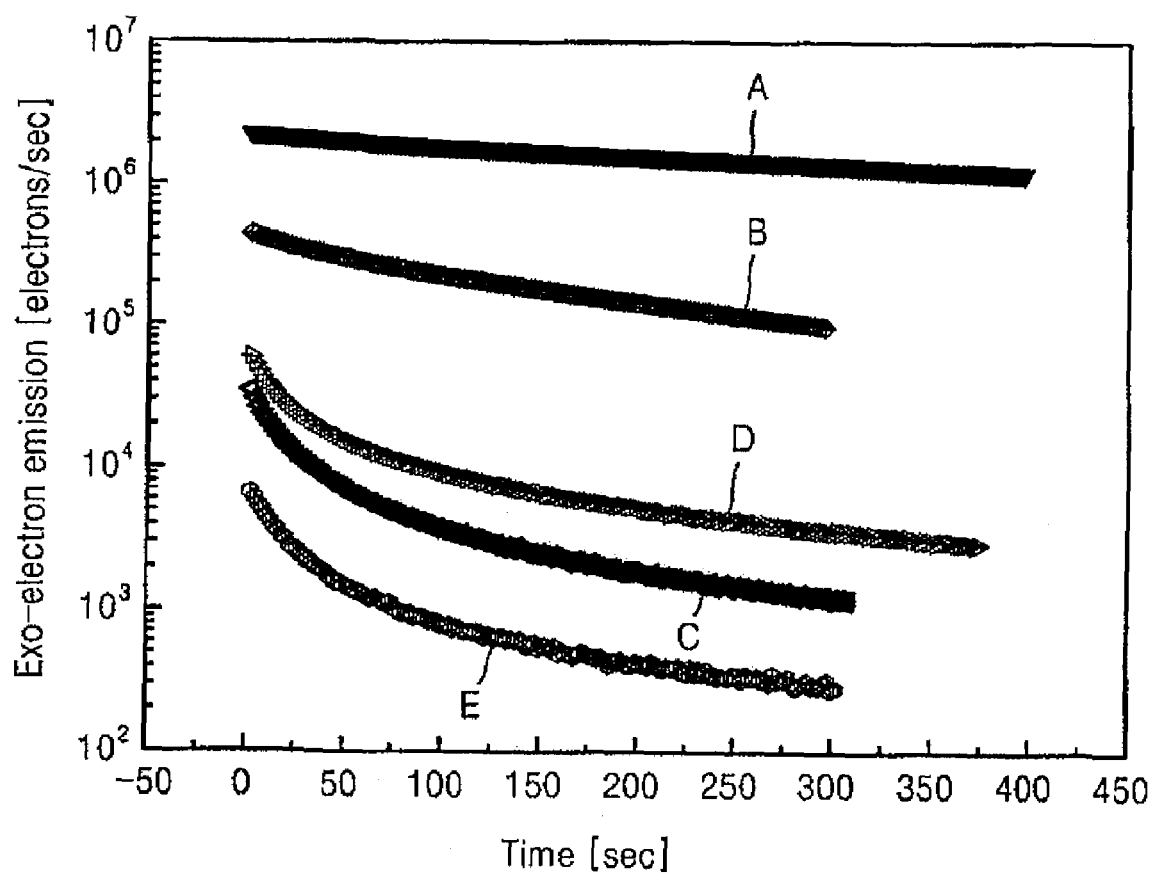

Referring to FIG. 8, the protective layer A had much higher light emission characteristics even after the supply of the discharge voltage was cut off than those of the protective layers B, C, and D of Comparative Examples. Furthermore, the exo-emission characteristics of the protective layer A were hundred to thousand times higher than those of the polycrystalline magnesium oxide thin film E of Contrastive Example.

The quantity of electrons reduced over time of the protective layer A was also lower than those of the protective layers B, C, and D and the polycrystalline magnesium oxide thin film E of Contrastive Example. The protective layer A showed first order exponential decay.

The protective layer A of conducted electrons in the vicinity of a conduction band, and in the protective layer A, only basic electron traps existed and electrons remaining in traps were recombined with holes after excitation. However, in the protective layers C and D, not only electron traps but also recombination centers of various mechanisms existed, thereby increasing a cathode luminescence intensity and causing different electron emission reductions. The large quantity of electrons emitted from the protective layer A reduced a discharge delay time during a subsequent discharge and increased the value $\gamma_{effective}$ in a photo-emission to reduce a discharge voltage.

As described above, the protective layer formed of the material prepared by specific vapor deposition according to the present embodiments is a single crystalline protective layer that contains an extremely small quantity of impurities, is thermodynamically stable, has few defects, and also has a high value $\gamma_{effective}$ due to high photon emission and exo-electron emission. Accordingly, the protective layer according to the present embodiments can remarkably reduce a firing voltage and a sustain voltage. Hence, the protective layer according to the present embodiments can considerably improve discharge efficiency by increasing the content of xenon (Xe) that is most challenging in the study of PDPs.

While the present embodiments have been particularly shown and described with reference to exemplary embodiments thereof it will be understood by those of ordinary skill in the art that various changes in form and details may be made therein without departing from the spirit and scope of the present embodiments as defined by the following claims.

What is claimed is:

1. A plasma display panel comprising:
   a front panel through which light is emitted to the outside of the PDP,
   a rear panel on which phosphors are disposed,
   a plurality of transparent electrodes disposed on a front glass substrate,
   bus electrodes disposed on the transparent electrodes in parallel to the transparent electrodes,
   a front dielectric layer configured to cover the transparent electrodes and bus electrodes,
   a protective layer configured to cover the front dielectric layer, and
   a discharge gas,
   wherein the protective layer comprises MgO having a first cathode-luminescence spectrum emission peak at a wavelength from about 300 nm to about 370 nm, and a second emission peak at a wavelength from about 600 to about 640 nm,
   and wherein the intensity ratio of the first emission peak to the second emission peak is from about 1:0.4 to about 1:0.6.

2. The plasma display panel of claim 1, wherein the protective layer include a first protective portion and a second protective portion,
   wherein the first protective portion comprises polycrystalline magnesium oxide,
   wherein the second protective portion comprises the MgO.

3. The plasma display panel of claim 2, wherein the second protective portion is irregularly formed on the first protective portion.

4. The plasma display panel of claim 2, wherein the second protective portion has a maximum intensity from about 0.5 to about 10 times that of the first protective portion.

5. The plasma display panel of claim 2, wherein the second protective portion covers substantially the entire top surface of the first protective portion.

6. The plasma display panel of claim 2, wherein the second protective portion is formed by one selected from the group consisting of patterning and inject printing.

7. The plasma display panel of claim 1, wherein the first protective portion comprises polycrystalline magnesium oxide having a cathode-luminescence spectrum emission peak at a wavelength from about 380 nm to about 400 nm.

8. The plasma display panel of claim 1, wherein the MgO comprises less than 2 ppm of each of nickel (Ni), iron (Fe), barium (B), silicon (Si), manganese (Mn), chrome (Cr), calcium (Ca), copper (Cu), zirconium (Zr), aluminum (Al), and sodium (Na).

9. The plasma display panel of claim 1, further comprising wherein the magnesium oxide powder has a third emission peak at a wavelength from about 700 nm to about 800 nm wherein the intensity ratio of the first emission peak to the third emission peak is from about 1:0.25 to about 1:0.45.

10. The plasma display panel of claim 1, wherein the discharge gas comprises Xe.

11. The plasma display panel of claim 10, wherein the discharge gas comprises about 10% Xe.

* * * * *